United States Patent [19]

Smith et al.

[11] Patent Number: 5,423,399
[45] Date of Patent: Jun. 13, 1995

[54] GAS PRESSURIZED OIL REPLENISHMENT SYSTEM FOR BEARING ASSEMBLIES

[75] Inventors: Dennis W. Smith, Phoenix; Edward F. Silvent, Glendale; Mark H. Warner, Tucson, all of Ariz.

[73] Assignee: Honeywell Inc., Minneapolis, Minn.

[21] Appl. No.: 6,739

[22] Filed: Jan. 21, 1993

[51] Int. Cl.$^6$ ............................................. F16C 1/24
[52] U.S. Cl. .................... 184/5.1; 184/7.4; 184/29; 384/471
[58] Field of Search ............... 184/7.4, 29, 55.1, 45.1, 184/39, 5.1; 384/462, 471, 473

[56] References Cited

U.S. PATENT DOCUMENTS

| | | | |
|---|---|---|---|
| 2,130,583 | 9/1938 | Fosnot | 184/55.1 |
| 2,611,668 | 9/1952 | Douglass | 384/471 |
| 3,231,317 | 1/1966 | Dudar | 384/471 |
| 4,058,185 | 11/1977 | Ploeger | 184/45.1 |
| 4,190,133 | 2/1980 | Ploeger | 184/45.1 |
| 4,726,448 | 2/1988 | Schroeder et al. | 184/3.2 |
| 4,738,336 | 4/1988 | Smith et al. | 184/6.4 |

FOREIGN PATENT DOCUMENTS 1136955 9/1962 Germany ............... 384/471

OTHER PUBLICATIONS

*NASA Tech Brief* Dynamic-Reservoir Lubricating Device Jul. 1968.
Proprietary Materials disclosed to TRW during presentation of Aug. 8, 1991.
"Positive Lubrication System", D. W. Smith and F. L. Hopper, Apr. 18–19, 1990.

*Primary Examiner*—Thomas E. Denion
*Attorney, Agent, or Firm*—Thomas A. Rendos

[57] ABSTRACT

A system is disclosed for supplying a lubricant to a bearing assembly, such as that in a gyroscope of a spacecraft. The system includes a housing which is connected to the bearing assembly and which forms a pressurized chamber. A collapsible member, such as a bellows, in the pressurized chamber houses a supply of lubricant. One or more valves regulate and control the flow of lubricant from the collapsible member to the bearing assembly. In response to the actuation of the valves, flow of lubricant is caused by pressure exerted on the collapsible member. Lubricant flow conduits may also be formed within the housing, so that lubricant may be provided directly to a portion of the bearing assembly.

19 Claims, 2 Drawing Sheets

GAS PRESSURIZED OIL REPLENISHMENT SYSTEM FOR BEARING ASSEMBLIES

BACKGROUND OF THE INVENTION

1. Field of the Invention

This invention relates generally to a system for supplying a lubricant and more particularly to a system for providing lubricant to a bearing assembly. Even more particularly, the bearing assembly may be within a control moment gyroscope or a reaction wheel assembly for a spacecraft.

2. The Prior Art

The appropriate provision of lubricant to any bearing assembly is important, if not critical, to the life and proper operation of the bearing. Proper lubrication is even more critical in certain environments. For example, in order to maintain the low drag torque performance of spin bearings for operation in space, it is necessary to use very limited quantities of oil or grease. The life of such bearing systems is limited by the reduction in quantity of and degradation of the lubricant. In order to extend the useful life of such a bearing and lubrication system, an active oil lubrication system was developed, as disclosed in U.S. Pat. No. 4,738,336.

The system disclosed in U.S. Pat. No. 4,738,336 included three primary components and was designed for a large spin bearing application. The bearing and lubrication system were comprised of a spring loaded bellows reservoir, which was mounted in a housing and connected through a solenoid activated valve and a length of tubing to the bearing. When commanded, the valve opened for a specific period of time and a quantity of oil was delivered to the bearing. The system also included a sensor to detect the presence of an adequate amount of lubricant in the bearing and control system to determine when additional oil was required. In that system, the exact quantity of lubricant was a function of the amount of time that the valve was opened, the temperature of the lubricant, since that affects the viscosity, and the amount of lubricant that had already been delivered, since the reservoir pressure was reduced as oil was depleted.

Although this system provided many advantages, it does not lend itself to spacecraft applications in which weight and envelope are critical parameters. Additionally, the reservoir pressure can vary over the useful life of the device.

In order to improve upon the system disclosed in U.S. Pat. No. 4,738,336, another system was developed in an effort to maintain the oil delivery quantity more constant over the life of the system. This improved system is disclosed in a presentation entitled "Positive Lubrication System," which was presented at the 24th Aerospace Mechanism Symposium, Apr. 18-19, 1990, at the NASA-Kennedy Space Center.

In the improved system disclosed in "Positive Lubrication System," an accumulator reservoir was provided and was supplied with lubricant from the main oil reservoir. A tubing assembly, which had a high flow resistance, provided the delivery of lubricant to the bearing and assured that the flow of oil was initiated only after the accumulator had been fully charged. Even though this system provided additional advantages it, too, because of its size, does not lend itself to bearing lubrication applications in densely packaged spacecraft components.

SUMMARY OF THE INVENTION

The present invention adds further to the advantages provided by the disclosed prior art systems, through a lubrication supply system which includes a housing for a source of lubricant for the system. The source is operable in response to pressure in the housing to supply lubricant to a valve for regulating lubricant flow. From the valve, the lubricant is conveyed through a conduit in communication with the assembly in order to supply a lubricant from the source to the assembly.

In another aspect of the invention, the housing is connected to the assembly requiring lubrication. Further, the flow conduit to the assembly is formed at least in part by a conduit formed in the housing.

In another aspect of the invention, the member forming the source for lubricant is collapsible and thereby operable in response to pressure in the housing. Also, the valve itself may be located within the housing.

In another aspect of the invention, the assembly requiring lubrication is a bearing assembly. In such an assembly, the housing may be arranged generally along the axis of the bearing assembly. Additionally, the housing may include an annular portion into which the bearing assembly can be located.

In another aspect of the invention, the bearing assembly may include a pair of bearings in a duplex arrangement. In this aspect of the invention, a pair of valves may be provided and individual conduits may be provided within the housing assembly to supply lubricant from each valve to respective bearings.

In the method aspect of the invention, lubricant may be supplied to an assembly requiring lubrication, by providing a supply of lubricant in a member within a housing. The lubricant may be caused to flow from the member in response to pressure within the housing being applied to the member. The flow of lubricant may be regulated from that member, for example by a valve.

In another aspect of the method invention, the member may be collapsible and the lubricant may be flowed from the valve to the assembly requiring lubrication by way of a conduit formed in a housing which is connected to the assembly.

In another aspect of the inventive method, the assembly requiring lubricant may be a bearing assembly. In a more limited aspect of this invention, the housing forming may be arranged generally in axial alignment with the bearing assembly.

In another aspect of the inventive method, a plurality of valves may be provided, with each valve being placed in fluid communication with the collapsible member. Then, lubricant may be flowed from each valve to a separate bearing assembly at least in part by way of separate conduits formed in the housing which are in fluid communication with separate bearings.

Accordingly, the present invention provides at least the following additional advantages to the prior art. A simple lubrication system and method are provided, which can augment the supply of lubricant to bearing assemblies. This assembly and method can be accomplished within a small envelope, and even within spaces that previously went unused. As a result, the life of bearing assemblies can be increased. The invention is particularly suitable for use in control moment gyroscopes and reaction wheel assemblies for spacecraft. Additionally, the housing feature of this invention in combination with the collapsible member can provide a more constant pressure over the period for supplying lubrication from the collapsible member.

Further, cumbersome plumbing assemblies can be eliminated, thereby reducing costs and improving reliability. Additionally, the invention can be easily retrofitted to existing hardware.

These and other meritorious features and advantages will be more fully appreciated by those in the art, with reference to the following disclosure.

DESCRIPTION OF THE PREFERRED EMBODIMENTS

The present invention relates to a lubrication supply system 10 in conjunction with a shaft and bearing assembly 80. In accordance with this invention, lubrication is supplied to the shaft and bearing assembly in a manner to assure that a more constant quantity of lubricant is supplied over the life of the assembly and over a cycle of a given quantity of lubricant.

The bearing and shaft assembly 80 includes a shaft 82 which may be a part of any rotational assembly. One such assembly, in accordance with the present invention, may include a rotor shaft for a controlled moment gyroscope and a reaction wheel assembly for spacecraft. For example, a reaction wheel assembly changes speed for attitude control of a spacecraft, and therefore needs to have sufficient and proper quantities of lubricant provided to the bearing assembly for proper and accurate operation of the reaction wheel.

Figure 1:
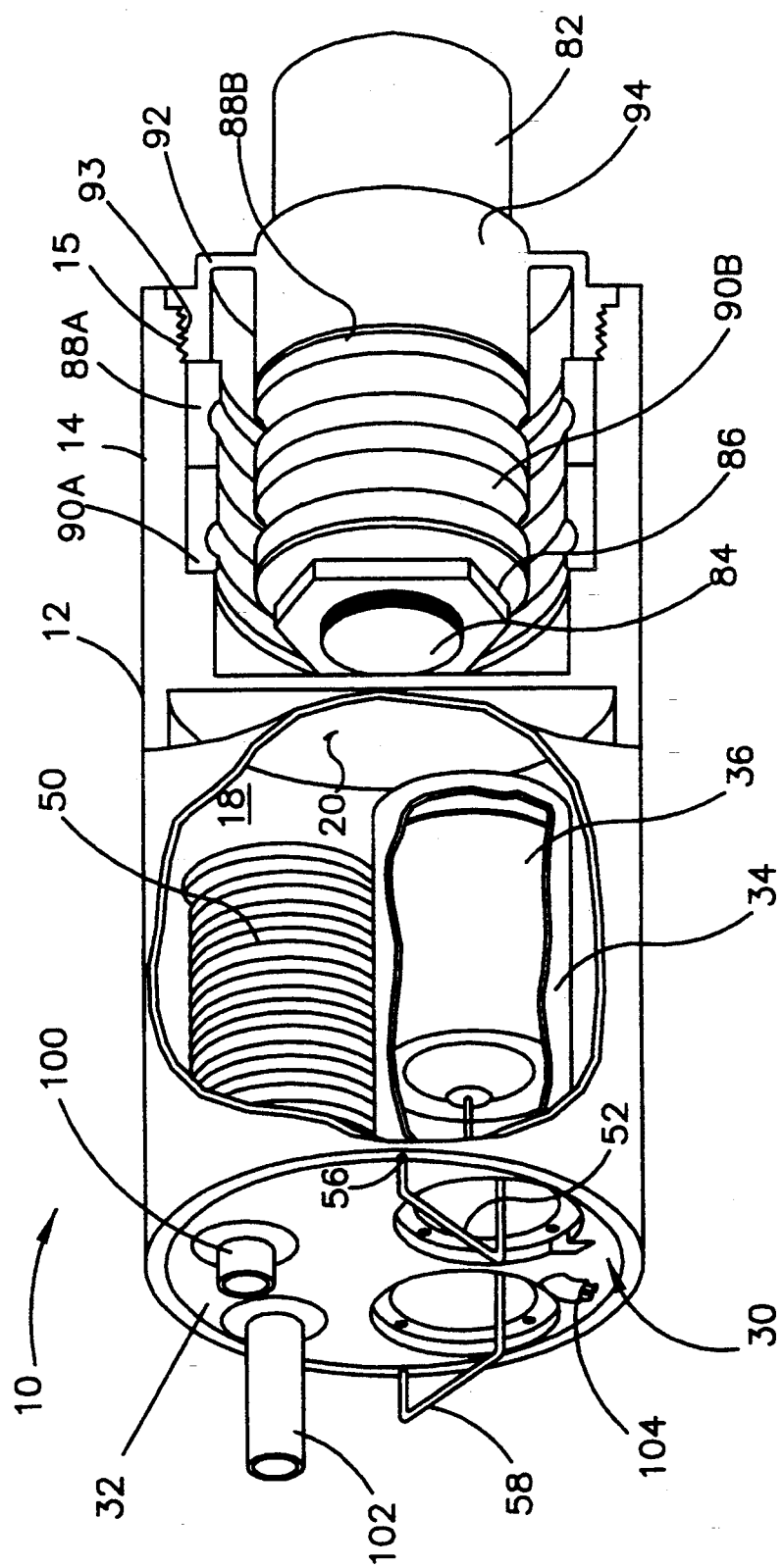
FIG. 1 is a perspective, cutaway illustration of a bearing and lubrication supply system in accordance with this disclosure.

As illustrated in FIG. 1, the shaft 82 terminates in a threaded end portion 84. A nut 86 may be threaded onto end portion 84 for holding a bearing assembly on the shaft 82 in proper position.

The bearing assembly itself may comprise one or more bearings. As illustrated in both FIGS. 1 and 2, the preferred bearing assembly includes a duplex bearing pair. An inboard bearing includes an outer bearing ring 88A, an inner bearing ring 88B, and a plurality of rolling elements bearing components 88C, the latter being illustrated only in FIG. 2. Correspondingly, an outboard bearing includes an outer bearing ring 90A, an inner bearing ring 90B and a plurality of roller elements components 90C. These bearing components are located within an annular portion 14 of a bearing cartridge 12. The bearing components are held in position by a preloading nut 92 which includes a threaded portion that engages a corresponding threaded shoulder 15 on the annular portion 14 of bearing cartridge 12. The preloading nut 92 may be threaded into the bearing cartridge 12 to apply a predetermined, desired amount of preload pressure on the bearing assemblies in accordance with the particular application, as is known in the art. The preloading nut 92 further includes an annular portion 94 which includes a surface 95 whose proximity provides a controlled clearance fit with the shaft 82. This arrangement thwarts lubricant evaporative loss between the surface 95 of the preloading nut 92 and the shaft during operation of the overall assembly.

Bearing cartridge housing 12 extends from its annular portion 14 in a manner in generally axial alignment with the bearing assembly and shaft 82. A distal annular portion 16 of the bearing cartridge forms a chamber 18 which is closed at one end by wall 20. As will be explained in greater detail below, chamber 18 may be pressurized to operate the lubrication supply system.

A valve housing assembly 30 closes off the other end of chamber 18. The assembly 30 may be appropriately secured within bearing cartridge 12 to form a seal, such as by welding. Assembly 30 includes an end portion 32 having integrally formed therewith two cylindrical housings 34, each of which include end members 35. Within each cylindrical housing 34 may be placed a suitable valve, such as a solenoid valve 36. Each valve may be sealed in position by a face O-ring 38. Solenoid valves 36 may be of conventional design, such as that disclosed in the publication "Positive Lubrication System," presented at the 24th Aerospace Mechanisms Symposium at the NASA-Kennedy Space Center on Apr. 18–19, 1990 (incorporated herein by reference).

Figure 2:
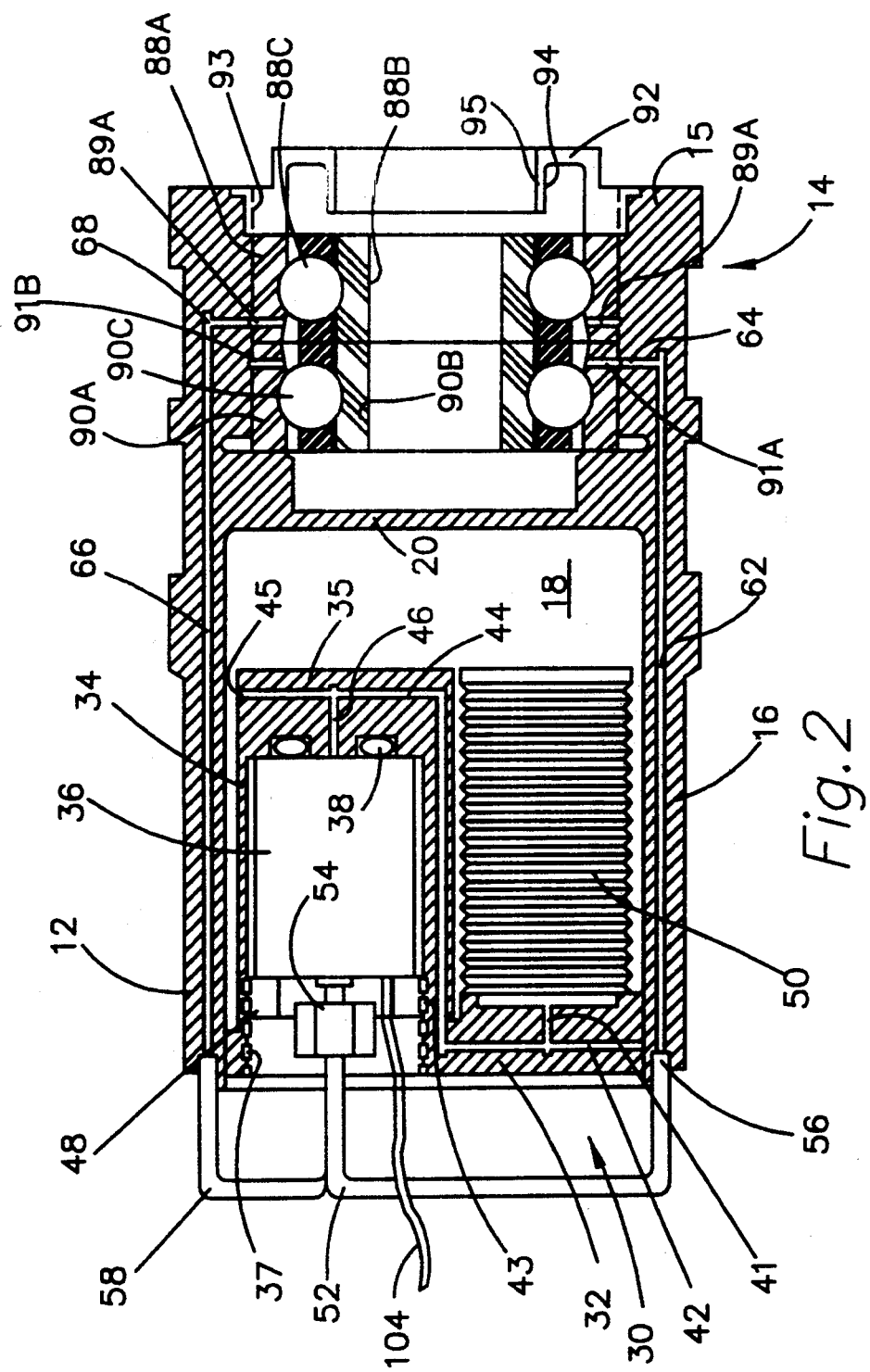
FIG. 2 is a cross sectional view of the bearing and lubrication supply system of this disclosure.

A suitable lubricant may be supplied to each valve 36 by a source 50. In the preferred embodiment, component 50 is comprised of a collapsible bellows, which is illustrated in both FIGS. 1 and 2 in essentially its full, extended position. (It will be appreciated that the view in FIG. 1 is rotated from that in FIG. 2.) As will be more fully appreciated by further disclosure, the bellows 50 will collapse during operation in response to pressure within chamber 18, as permitted by the operation of solenoid valves 36. The bellows 50 may be suitably connected to the valve housing assembly 30 as illustrated in FIG. 2 in order to establish a seal. One such method of connecting the bellows to the assembly 30 is by welding.

Lubricant flows from the bellows 50 through a flow cavity network formed within the housing assembly 30 in response to operation of the solenoid valves 36 and pressure applied within chamber 18. As illustrated in FIG. 2, a flow conduit 41 communicates with the bellows at one end and a lateral flow line 42 at the other end. The lateral flow line 42 then communicates with a flow line 43 formed in each cylindrical housing 34. Flow cavity 43 is arranged generally laterally along the length of the cylindrical housing and extends to a point in communication with a transverse flow cavity 44. Cavity 44 may be hermetically sealed at the end which extends to the exterior of cylinder 34, as by a laser weld at position 45. Flow cavity 46 receives lubricant from cavity 44 and provides a flow path for lubricant to be supplied to each solenoid valve 36.

Solenoid valves 36 may be operated and controlled in a variety of manners. For example, the valves 36 may be actuated in response to an electronic system such as that disclosed in U.S. Pat. No. 4,738,336 (incorporated herein by reference). Alternatively, the valves may be operated manually at a predetermined time, which is established by the particular bearing assembly and environmental conditions, in order to supply an adequate and proper amount of lubricant to the bearing assembly.

Valves 36 may be held in position within the cylindrical housings 34 of the valve housing assembly 30 by an externally threaded nut 48 which is received within internal threads 37 of the housing assembly. Appropriate pressure may be exerted by each nut 48 on its respective solenoid valve 36 in order to appropriately seat the valve within each cylindrical housing against face O-ring 38 to establish an appropriate seal.

Lubricant is conveyed by each valve 36 to the bearing assembly by way of feed tubes and conduits formed within the bearing cartridge housing. A first feed tube 52 extends from one valve 36, to which it is connected by an in-line coupling 54. The trailing or distal end 56 of feed tube 52 is secured to the bearing cartridge housing in a manner to create a seal, such as by welding. Similarly, a separate feed tube 58 extends from a separate valve and is similarly connected with the bearing cartridge housing in a separate location. These feed tubes may be of any suitable material, such as stainless steel.

Feed tube 52 communicates with a laterally extending flow conduit 62 formed along a substantial length of the bearing cartridge housing 12. A radially extending conduit 64 communicates with conduit 62, conduit 64 extending to the interior surface of the annular portion 14 of the cartridge housing. Similarly, flow tube 58 communicates with another laterally extending flow conduit 66 which communicates with another radially extending flow conduit 68, which similarly extends to the interior surface of the annular portion 14 of the bearing cartridge. Flow conduits 64 and 68 each communicate with oil ports formed in the outer bearing rings 88A and 90A. Two such ports 89A and 89B are illustrated in outer bearing ring 88A, but any desired quantity of such ports may be provided, such as four. Correspondingly, two such flow ports 91A and 91B are shown in outer bearing 90A of the outboard bearing. It will now, therefore, be appreciated that the preloading nut 92 establishes a labyrinth seal at the inboard end of the bearing rings 88A and 88B.

FIG. 1 further illustrates fill lines for both the lubricant source 50 and the pressurized chamber 18. Specifically, a fill line 100 is provided so that lubricant may be supplied internally to the bellows 50. This supply line may include an appropriate valve or cutoff assembly (not shown), as will be well known in the art. A fill line 102 is illustrated in FIG. 1 for supplying an appropriate gas to pressurized chamber 18. Such a gas may be carbon dioxide, nitrogen, or any suitable inert gas that would preferably be of such a nature to be comprised of a relatively large molecular weight to minimize leakage from within the pressurized chamber 18. Another suitable inert gas may be xenon, but the particular selection of the gas will depend on the temperature range to which the pressurized chamber 18 will be subjected in operation.

As with fill line 100, fill line 102 may include a suitable valve or other cutoff mechanism (not shown), as will be known to those of skill in the art.

FIGS. 1 and 2 further illustrate an electrical lead 104 for controlling the operation of valve 36. Although FIG. 1 illustrates only one such electrical lead, another lead will be provided for operating the other of the valves.

In operation, shaft 82 will rotate within the bearing assembly and thereby deplete lubricant. At predetermined times, or in response to an appropriate control, such as illustrated in U.S. Pat. No. 4,738,33.6, each of the solenoid valves 36 will be actuated either separate or in conjunction to supply lubricant through flow lines 52 and 58. Lubricant supplied through flow line 52 will flow through associated conduit 62 to radially extending conduit 64 into an appropriate port, such as 91A, in the outer bearing ring 90A to supply lubricant in an appropriate amount to that bearing arrangement. Similarly, lubricant supplied through flow tube 58 will flow through laterally extending conduit 66 to radially extending conduit 68 and in turn to flow ports, such as 89B, in outer bearing ring 88A.

In response to the actuation of the solenoid valves 36, lubricant will flow into those valves by internal flow cavities within the valve housing assembly 32. Flow of lubricant will be caused by the collapse of bellows 50 in response to pressure exerted upon that member by gas within internal pressurized chamber 18. Because the inert gas within chamber 18 is highly compressible and the oil within the bellows 50 is relatively incompressible, the gas expansion caused by collapse of the bellows reservoir, as lubricant is depleted, results in a minimal pressure drop within the chamber. As a result, a near constant lubricant pressure is maintained over the life of the supply of lubricant within the bellows 50 and until a fresh supply of lubricant is provided. Thus, it is assured that a substantially repeatable quantity of lubricant may be provided to the bearing assembly in order to achieve the proper quantity of lubricant that is needed. The pressure drop during the operation of the bellows 50 within any given supply of lubricant may further be minimized by optimizing the compliance, (i.e. stiffness) of the bellows. Obviously, the bellows may be chosen in accordance with the operating parameters of the particular system.

From this detailed description of the preferred embodiment of the invention, it can be more fully appreciated that the invention can prolong the life of a bearing assembly by virtue of providing the appropriate and proper quantity of lubricant over the operation of the supply system. Further, lubricant is supplied directly to the bearing ball race interface of the bearing assembly, where it is required. Additionally, the supply system is packaged in a manner to conserve envelope space which may be important in certain environments, such as spacecraft. In the particular disclosed embodiment of a reaction wheel assembly, the lubrication supply system may be positioned in previously unused space. Further, it will be appreciated from this detailed disclosure that because the lubricant supply system is packaged integrally with the bearing cartridge, lubricant need not be conveyed across dynamic surfaces. Finally, it can also be appreciated that few seals are provided in this arrangement, by way of which lubricant loss might occur.

Although the present invention has been described in terms of a preferred embodiment, it will be apparent to those of ordinary skill in the art that various modifications can be made to the disclosure without departing from the overall spirit and scope of the invention. For example, the lubrication supply system could be used with any assemblies requiring lubrication, and not just with the disclosed bearing assembly. Further, another example is that the disclosed solenoid valve could be replaced with another type of valve, such as a shape memory alloy actuated valve, which would perform the same function as the solenoid, but with significantly less power and weight. Further, the bellows reservoir could be replaced with another type of member with a lower compliance, such as a bladder, which might maintain an even more constant oil pressure over the useful life of the device.

Additionally, each solenoid valve may be controlled or operated independently so as to provide lubricant to the inboard and outboard bearing assemblies 88 and 90 as needed.

Having therefore, fully and completely described our invention,

What is claimed is:

1. A method of supplying a lubricant to an assembly requiring lubrication, comprising the steps of:
   providing a supply of lubricant in a collapsible member located within a pressurized chamber;
   causing the lubricant to flow from the member in response to pressure within the chamber acting upon the collapsible member; and
   intermittently flowing lubricant from the member to the assembly by way of a valve.

2. The method of claim 1, wherein the chamber retains pressure without being connected to an external pressure source.

3. The method of claim 1, including the additional step of flowing the lubricant to the assembly at least in part through a conduit formed within a housing wall and the housing forms the pressurized chamber and the housing is rigidly connected to the assembly.

4. A method of supplying a lubricant to a bearing assembly, comprising the steps of:
   providing a supply of lubricant in a collapsible member within a pressurized chamber;
   intermittently flowing lubricant from the collapsible member in response to pressure on the member by a valve; and
   flowing the lubricant from the valve to the bearing assembly at least in part by way of a conduit formed in a housing wall which forms the pressurized chamber and which is rigidly connected to the bearing assembly.

5. The method of claim 4, including the additional step of arranging the housing generally in axial alignment with the bearing assembly.

6. The method of claim 5, including the additional step of locating the valve in the housing.

7. The method of claim 6, including the additional steps of:
   providing a plurality of valves in the housing, each being in fluid communication with the collapsible member; and
   flowing lubricant from each valve to a separate bearing assembly at least in part by way of separate conduits formed in the housing and which are in fluid communication with separate bearings.

8. A lubrication system for a bearing assembly, comprising:
   a pre-pressurized chamber formed at least in part by a housing that is connected to the bearing assembly;
   a source of lubricant for the bearing assembly, the source being comprised of a collapsible member located in the pre-pressurized chamber, the collapsible member being operable in response to pressure in the chamber to supply lubricant to a solenoid valve within the housing, the solenoid valve intermittently dispensing lubricant; a flow conduit formed in the housing and in communication with the bearing assembly and the solenoid valve, to supply lubricant to the bearing assembly.

9. The system of claim 8, wherein the housing is arranged generally along the axis of the bearing assembly 10. The system of claim 9, wherein the housing includes an annular portion into which the bearing assembly is located.

11. A combination bearing and lubrication system, comprising:
    a shaft;
    a bearing assembly in operable an arrangement with the shaft;
    a housing in fixed engagement with the bearing assembly and extending generally in axial alignment with the shaft, the housing forming a chamber capable of retaining a pressurized gas;
    a member in the chamber for supplying lubricant in response to pressure within the chamber;
    a solenoid valve within the housing and in fluid communication with the member, the solenoid valve permitting intermittent flow of lubricant from the member to the bearing assembly; and
    a conduit to supply lubricant from the solenoid valve to the bearing assembly.

12. The combination bearing and lubrication system of claim 11, wherein the conduit is formed in at least a portion of the housing.

13. The combination bearing and lubrication system of claim 11, wherein a plurality of valves are located within the housing, the number of valves corresponding to the number of bearings in the combination.

14. The combination bearing and lubrication system of claim 11, wherein the member is collapsible in response to the pressure within the chamber.

15. The combination bearing and lubrication system of claim 11, wherein the member is a collapsible bellows.

16. The combination bearing and lubrication system of claim 11, wherein the housing includes an annular portion that surrounds and holds the bearing assembly and the conduit extends laterally through the housing generally parallel with the axis of the shaft and then extends radially in the annular portion of the housing to communicate with generally radially arranged ports in the bearing assembly.

17. A bearing assembly lubricator, comprising:
    a body adapted at one end to receive a bearing assembly;
    a substantially cylindrical wall integral with the body and defining a pressurized chamber within the body, the pressurized chamber capable of retaining a pressurized gas;
    a collapsible member located in the pressurized chamber, the collapsible member adapted to contain a predetermined amount of lubricant and to segregate the lubricant from the pressurized chamber;
    a conduit in fluid communication between the collapsible member and the bearing assembly; and
    a valve integral with the conduit, the valve having at a de-energized condition in which flow of lubricant to the bearing assembly is restricted, and an energized condition in which the flow of lubricant to the bearing assembly is enhanced.

18. The bearing assembly lubricator of claim 17 wherein the valve is a solenoid valve.

19. The bearing assembly lubricator of claim 17 wherein the pressurized chamber is coaxial with the bearing assembly, and the conduit is within the pressure chamber wall.

* * * * *